US007736072B2

(12) United States Patent
Tian

(10) Patent No.: US 7,736,072 B2
(45) Date of Patent: Jun. 15, 2010

(54) BATTERY PACK FOR A CAMERA

(76) Inventor: Yongzhong Tian, 6th Floor, Suite D, Building 213, Tai Ran Jiu Lu, Chegongmiao, Shenzhen City, Guangdong Province (CN) 518040

( * ) Notice: Subject to any disclaimer, the term of this patent is extended or adjusted under 35 U.S.C. 154(b) by 370 days.

(21) Appl. No.: 11/683,042

(22) Filed: Mar. 7, 2007

(65) Prior Publication Data
US 2008/0219659 A1 Sep. 11, 2008

(51) Int. Cl.
G03B 17/00 (2006.01)
G03B 17/02 (2006.01)
H04M 1/00 (2006.01)
H04B 1/38 (2006.01)

(52) U.S. Cl. .................. 396/422; 396/539; 455/572
(58) Field of Classification Search ................ 396/539, 396/541, 542, 301, 422; 455/456.1; 348/211.3, 348/211.13
See application file for complete search history.

(56) References Cited

U.S. PATENT DOCUMENTS

| 6,243,596 | B1 * | 6/2001 | Kikinis | 455/572 |
| 6,970,183 | B1 * | 11/2005 | Monroe | 348/143 |
| 2004/0038088 | A1 * | 2/2004 | Suto | 429/9 |
| 2004/0192329 | A1 * | 9/2004 | Barbosa et al. | 455/456.1 |
| 2005/0213297 | A1 | 9/2005 | Ulla et al. | 361/683 |
| 2008/0095525 | A1 * | 4/2008 | Maggert et al. | 396/301 |

FOREIGN PATENT DOCUMENTS

| GB | 2374237 A | 10/2002 |
| JP | 2001-22898 A | 1/2001 |
| JP | 2006-129045 A | 5/2006 |
| WO | WO 00/50955 | * 8/2000 |

OTHER PUBLICATIONS

State Intellectual Property Office, China P.R.C., International Search Report and Written Opinion for International Application No. PCT/CN2008/000442, mailed Jun. 12, 2008.

* cited by examiner

Primary Examiner—Melissa J Koval
(74) Attorney, Agent, or Firm—Perkins Coie LLP

(57) ABSTRACT

A battery pack for a camera includes a main housing for containing one or more batteries. An adaptor electrically connected to the one or more batteries protrudes from the main housing and is configured for electrical engagement with a camera supported on the main housing. The battery pack optionally includes one or more of the following: a display screen on the main housing for displaying system functions or images and videos captured by the camera; a wireless transmission device in the main housing for transmitting images captured by the camera to a remote receiver; one or more memory unit housings in the main housing for receiving one or more memory units.

19 Claims, 1 Drawing Sheet

BATTERY PACK FOR A CAMERA

BACKGROUND

Battery packs for cameras, such as digital cameras, are commonly used for supporting and providing power to cameras, particularly to cameras used by professional photographers. These battery packs typically include a housing for containing one or more batteries, and may include one or more buttons, switches, knobs, or the like for controlling various functions (e.g., zoom) of a camera mounted on and electrically connected to the battery pack. While existing battery packs have effectively functioned as power sources for cameras, they typically have not included many features.

SUMMARY

A battery pack for a camera includes a main housing for containing one or more batteries. An adaptor electrically connected to the one or more batteries protrudes from the main housing and is configured for electrical engagement with a camera supported on the main housing. The battery pack optionally includes one or more of the following: a display screen on the main housing for displaying system functions or images and videos captured by the camera; a wireless transmission device in the main housing for transmitting images captured by the camera to a remote receiver; one or more memory unit housings in the main housing for receiving one or more memory units.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Figure 1:
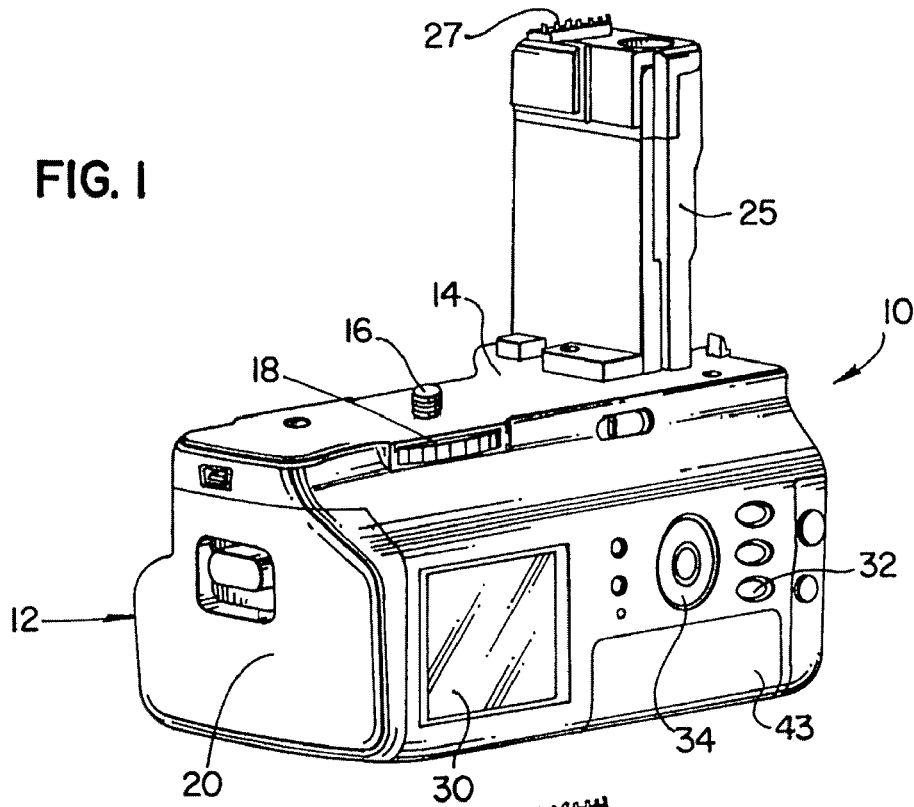
FIG. 1 is a perspective view of a battery pack for a camera (with the camera detached from the battery pack), according to one embodiment.

Turning now in detail to the drawings, as shown in FIG. 1, a battery pack 10 for a camera includes a main housing 12. The main housing 12 includes an upper base region 14 for supporting a camera (not shown). An attachment member 16 projects upwardly from the base region 14 for engaging an opening in the bottom of the camera. The attachment member 16 is preferably threaded for engagement with a corresponding threaded opening in the bottom of the camera. The attachment member 16 is preferably rotatable via a wheel 18 or other mechanism to which it is rotatably connected.

The camera may be secured to the battery pack 10 by aligning the attachment member 16 with the threaded camera opening and rotating the wheel 18 such that the attachment member 16 threads into the camera opening, thereby drawing the camera into secure engagement against the base region 14. Any other suitable connecting mechanism may alternatively or additionally be used to secure the camera to the battery pack 10. A locking mechanism may optionally be included for securing the camera to the battery pack 10 such that it cannot be removed without the use of a key or other unlocking device.

One or more batteries, such as lithium or AA batteries, for example, may be contained within the main housing 12. The interior of the main housing 12 may be configured to directly receive the batteries, or may be configured to receive a tray or other battery carrier configured to slide into the main housing 12. The main housing 12 preferably includes a side door 20 through which the batteries or battery carrier may be inserted. The interior of the main housing 12 preferably includes one or more metal contacts through which electricity provided by the batteries may be conducted. If used, the tray or battery carrier includes corresponding metal contacts for engaging or interacting with the metal contacts in the main housing 12, as well as metal contacts for engaging or interacting with one or more batteries in the tray or carrier.

An adaptor 25 protrudes upwardly (or in another suitable direction) from the main housing 12 for electrical engagement with a camera when the camera is supported on the main housing 12. The adaptor 25 preferably includes metal pins 27, or other connectors or interconnects, for engaging corresponding receiving openings or receiving elements in the camera. The metal pins 27 are connected, via one or more metal strips, wires, printed circuit boards, or other suitable connectors to the metal contacts in the main housing 12 for providing an electrical pathway between the batteries and the camera. Any other suitable mechanism or configuration for providing electrical power between the one or more batteries and the camera may alternatively be used. Furthermore, the camera may be specifically configured for engagement with the adaptor 25, or the adaptor 25 may be configured for insertion into a standard battery housing in a variety of cameras.

At least one microprocessor or central processing unit, referred to hereinafter as a "processor," is included in the main housing 12 or in another suitable location (e.g., in the adaptor 25). The processor controls the various functions or applications of the battery pack 10, which are described in detail below. The processor is preferably powered by the one or more batteries contained in the main housing 12.

In one embodiment, a display screen 30, such as a liquid crystal display ("LCD") screen or other suitable screen, is included on the user side of the main housing 12. The display screen 30 is optionally able to display one or more menus listing the battery pack's functions, one or more menus listing the camera's functions, images captured by the camera, date and time information, or any other suitable images or information.

One or more buttons 32, touch pads 34, switches, scroll wheels, joysticks, or other user interface mechanisms are included on the main housing 12 for allowing a user to control the various battery pack features or functions, such as scrolling through, rotating, or zooming images shown on the display screen 30 (or on a display screen of the camera itself), navigating menu options, powering on and off the battery pack or camera, or controlling any camera or battery pack features, such as the features described below. In one embodiment, the display screen is a "touch screen" that allows a user to select various options by touching the screen where the desired option is displayed. A touch screen may optionally be used in combination with one or more additional user interface mechanisms. A remote control device may optionally be included for controlling the battery pack or camera features, as well.

Figure 2:
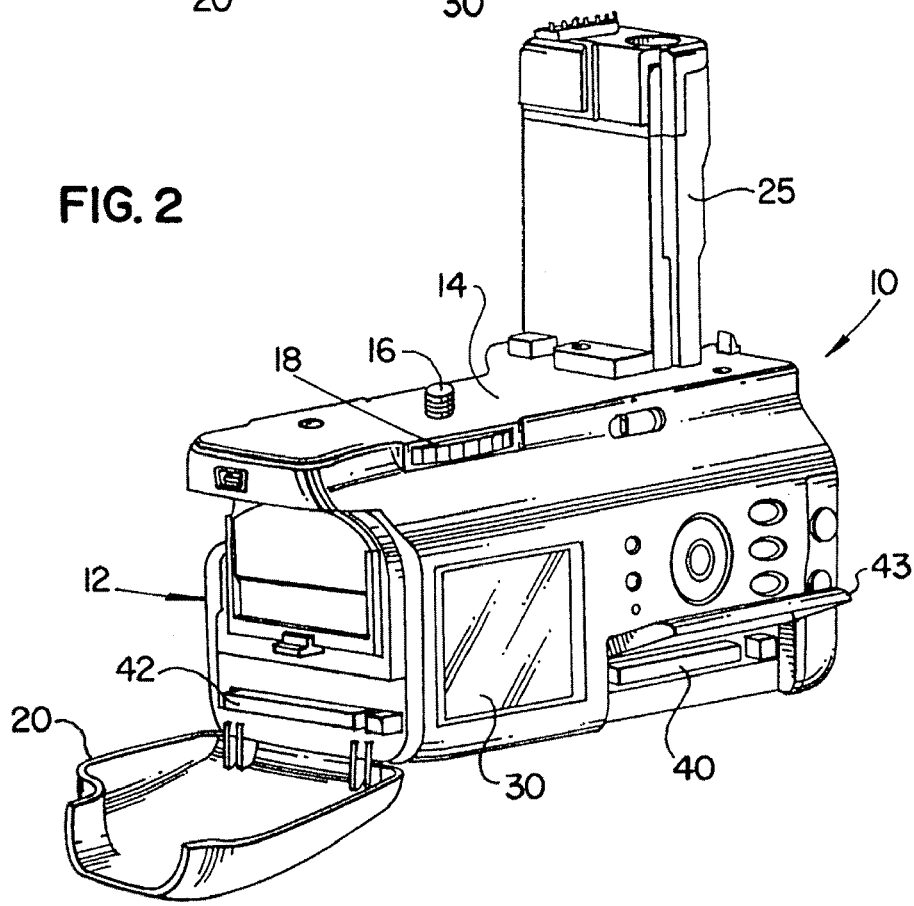
FIG. 2 is perspective view of the battery pack shown in FIG. 1 with doors opened on the main housing to expose memory card housings and an interior of the main housing of the battery pack.

In another embodiment, one or more memory card housings are included in the main housing 12 or in another suitable location. In the embodiment illustrated in FIG. 2, a first memory card housing, in which a first memory card 40 is inserted, is located behind a user-side door 43 in the main housing 12. A second memory card housing, in which a second memory card 42 is inserted, is located behind the side door 20 in the main housing 12. Each memory card housing may be configured to receive and engage memory cards of any suitable size. Additionally or alternatively, the battery pack 10 may include one or more housings for receiving other types of memory devices, such as floppy disks, memory sticks, or other suitable memory devices. A flash memory storage unit may also optionally be included in the battery pack 10. All of these memory devices will be collectively referred to hereinafter as "memory units."

A memory unit may be used to store images or videos captured by the camera, preferred user settings for the camera or the battery pack 10, data from the battery pack 10, software applications, or any other suitable data or applications. Data may be directly transferred, via the processor, between the camera and one or more memory units housed in the battery pack 10. In one embodiment, data may also be transferred, via the processor, between two or more memory units housed in the battery pack 10. Thus, images and videos, for example, stored in one memory unit housed in the battery pack 10, may be transferred or copied to another memory unit housed in the battery pack 10.

The battery pack 10 optionally includes one or more universal serial bus ("USB") ports for connecting the battery pack to one or more external devices, such as an external computer, a USB "memory stick" or other memory device, an MP3/MP4 player, or any other suitable USB-compatible device. Data may be transferred between the battery pack 10 or the camera and the external device connected to the battery pack 10. Image data stored in a memory card housed in the battery pack 10, for example, may be transferred, via the processor, to a USB memory stick or MP3 player connected to a USB port in the battery pack 10.

Software applications may optionally be downloaded to and stored in a memory unit in the battery pack 10. The battery pack 10 may, for example, be connected to an external computer via a USB cable or a similar connecting device (or via a wireless connection). Software from an installation disk, a web site, or another suitable medium, which is accessible by the external computer, may then be downloaded to a selected memory unit in the battery pack 10, via the USB connection or other suitable connection. Any compatible software, such as photo-editing software, photo/video-viewing software (e.g., software including "slide show" features), software for organizing data files into a folder structure, or any other suitable software, may be downloaded to a memory unit in the battery pack 10.

In another embodiment, a wireless transmission device is included in the main housing 12, or in another suitable location in or on the battery pack 10. The wireless transmission device may be a radio frequency (RF) transmission device, such as a Bluetooth® transmission device, or may be any other suitable device. The wireless transmission device is preferably capable of transmitting data stored in a memory unit in the battery pack 10 (or in the camera itself) a distance suitable to meet the requirements of a given application. In one embodiment, a wireless transmission device capable of transmitting data at least 100 meters may be used. For some applications, a wireless transmission device capable of transmitting data over 1000 meters, or over 2000 meters, or over 3000 meters, or over greater distances, may be used.

In one embodiment, one or more memory units housed in the battery pack 10 are capable of receiving data transmitted from an external wireless transmission device, such that data may be transferred to the battery pack 10, as well. Data may also be transferred between two or more battery packs including wireless data transmission devices and memory units capable of receiving wireless transmissions.

One or more receivers, such as a portable RF receiving device, may be used for remotely receiving transmissions from the wireless transmission device. For example, a receiver may be located in a news vehicle. A news photographer using a camera attached to the battery pack 10, after capturing photographs or videos, may quickly transmit, via the wireless transmission device, the photographs or videos to the receiver located in the news vehicle. An operator in the news vehicle may then use the transmitted data to quickly prepare the photographs or videos for use in a newscast or other production. The efficiency of such a remote transmission system could be very beneficial for a news station attempting to be the first station to report a news story.

In another embodiment, a global positioning system ("GPS") device is included in the main housing 12, or in another suitable location, in the battery pack 10. The GPS device provides geographical location data, as well as optionally providing navigation guidance, regional maps, and time-reference data. In one embodiment, information provided by the GPS device may be displayed on the battery pack's display screen 30. The GPS device may optionally provide audible information, such as audible navigation information, as well.

A plurality of computer boards, or printed circuit boards, are preferably included in the main housing 12 for electrically connecting the various electronic devices and components of the battery pack 10 to the processor. In one embodiment, four computer boards are included in the main housing 12. Any other suitable number of computer boards may be included to meet the requirements of the various battery pack components. The various battery pack components may alternatively be connected to the processor via any other suitable electrical connectors.

Any of the above-described embodiments may be used alone or in combination with one another. Furthermore, the battery pack may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. A battery pack for a camera, comprising:
   a main housing including an interior region for containing at least one battery and an exterior base region for supporting a camera;
   an adaptor protruding from the main housing and electrically connected to the interior region of the main housing, with the adaptor configured for electrically engaging said camera supported horizontally on the exterior base region of the main housing;
   a first memory unit housing in the main housing for receiving a first memory unit; and
   a second memory unit housing in the main housing for receiving a second memory unit.

2. The battery pack of claim 1, wherein, when first and second memory units are inserted in the first and second memory unit housings, data is transferable between the first and second memory units via a processor in the main housing.

3. The battery pack of claim 1 further comprising a carrier in the main housing for supporting the at least one battery.

4. The battery pack of claim 1 wherein the adaptor is configured for engaging a battery housing in the camera.

5. The battery pack of claim 1 further comprising a processor in the main housing for transferring data from the camera to a memory unit in at least one of the first and second memory unit housings.

6. The battery pack of claim 1 further comprising at least a third memory unit housing in the main housing.

7. The battery pack of claim 1 further comprising a plurality of computer boards in the main housing.

8. A battery pack for a camera, comprising:
   a main housing including an interior region for containing at least one battery and an exterior base region for supporting a camera;
   a plurality of memory card housings in the main housing for receiving a plurality of memory cards;
   an adaptor protruding from the main housing and electrically connected to the interior region of the main housing, with the adaptor configured for electrically engaging said camera supported horizontally on the exterior base region of the main housing; and
   a wireless transmission device in or on the main housing for transmitting data captured by the camera to a receiver.

9. The battery pack of claim 8 wherein the wireless transmission device has a transmission range of at least 100 meters.

10. The battery pack of claim 8 wherein the adaptor is configured for engaging a battery housing in the camera.

11. The battery pack of claim 8 further comprising a carrier in the main housing for supporting the at least one battery.

12. A battery pack for a camera, comprising:
    a main housing including an interior region for containing at least one battery and an exterior base region for supporting a camera;
    an adaptor protruding from the main housing and electrically connected to the interior of the main housing, with the adaptor configured for electrically engaging said camera supported horizontally on the exterior base region of the main housing; and
    a display screen on the main housing for displaying battery pack functions or images captured by a camera.

13. The battery pack of claim 12 further comprising a wireless transmission device in or on the main housing for transmitting data captured by the camera to a receiver.

14. The battery pack of claim 13 wherein the wireless transmission device has a transmission range of at least 100 meters.

15. The battery pack of claim 12 further comprising a plurality of memory card housings in the main housing for receiving a plurality of memory cards.

16. The battery pack of claim 12 wherein the display screen is adapted for displaying video images captured by the camera.

17. The battery pack of claim 12 wherein the main housing includes a base region for supporting the camera, with an attachment mechanism protruding from the base region for engaging a corresponding opening in the camera.

18. The battery pack of claim 12 further comprising a GPS device in the main housing for providing GPS data.

19. The battery pack of claim 18 wherein the display screen is adapted for displaying the GPS data.

* * * * *